(12) United States Patent
Stephan

(10) Patent No.: US 8,931,989 B2
(45) Date of Patent: Jan. 13, 2015

(54) SELF SEALING ATTACHMENT ASSEMBLY

(76) Inventor: Greg Stephan, Newbury Park, CA (US)

( * ) Notice: Subject to any disclaimer, the term of this patent is extended or adjusted under 35 U.S.C. 154(b) by 348 days.

(21) Appl. No.: 12/833,437

(22) Filed: Jul. 9, 2010

(65) Prior Publication Data

US 2012/0005983 A1      Jan. 12, 2012

(51) Int. Cl.
*F16B 43/00* (2006.01)
*F16J 15/14* (2006.01)
*F16B 15/00* (2006.01)

(52) U.S. Cl.
CPC .............. *F16J 15/14* (2013.01); *F16B 43/001* (2013.01); *F16B 15/00* (2013.01)
USPC ........................... 411/82; 411/542; 411/371.1

(58) Field of Classification Search
USPC ................. 411/82, 82.1, 83.2, 258, 930, 542, 411/371.1, 82.3
See application file for complete search history.

(56) References Cited

U.S. PATENT DOCUMENTS

| | | | | |
|---|---|---|---|---|
| 2,092,341 A | * | 9/1937 | De Vries | 52/704 |
| 2,666,354 A | * | 1/1954 | Dim et al. | 411/371.1 |
| 3,066,568 A | * | 12/1962 | Armour | 411/361 |
| 3,750,523 A | * | 8/1973 | Fujita | 411/484 |
| 4,555,206 A | * | 11/1985 | Sweeney | 411/23 |
| 5,044,852 A | * | 9/1991 | Sweeney et al. | 411/258 |
| 5,281,065 A | * | 1/1994 | Wu | 411/258 |
| 6,017,176 A | * | 1/2000 | Marui | 411/82 |
| 6,035,595 A | * | 3/2000 | Anderson | 52/363 |
| 7,833,620 B2 | * | 11/2010 | Enserink et al. | 428/321.1 |
| 8,011,868 B2 | * | 9/2011 | Stephan | 411/542 |

* cited by examiner

*Primary Examiner* — Flemming Saether
(74) *Attorney, Agent, or Firm* — Arent Fox LLP

(57) ABSTRACT

A self-sealing attachment assembly, includes a base portion defining a receptacle having an opening at one end and a surface with a through-hole at an opposite end, a sealant material in the receptacle, and a cover secured to the base portion and enclosing the opening, wherein the cover is configured to receive a driving force from a fastener and dispenses the sealant material via the through-hole by displacement through the receptacle when actuated by the driving force. A method is disclosed for installing a building material to a framing that includes mounting a self-sealing attachment assembly onto a fastening member and driving the fastening member through the sealing assembly and the building material toward the framing to dispense a sealant material to seal the penetration hole formed by the fastening member in the building material to form a watertight seal.

34 Claims, 18 Drawing Sheets

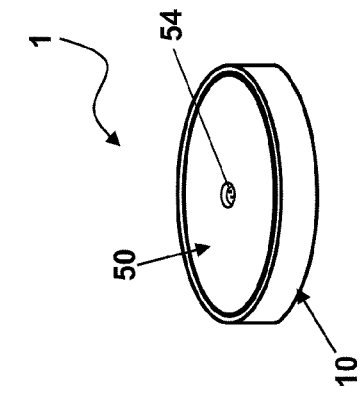
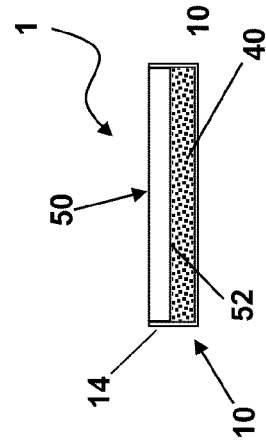
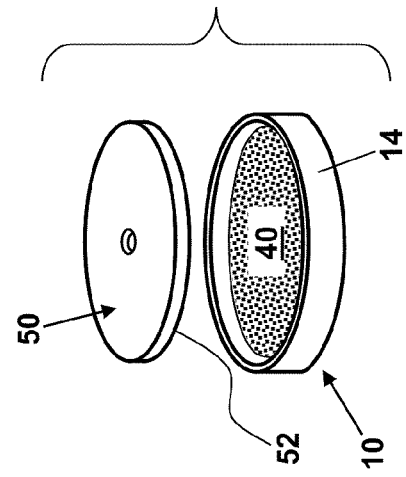
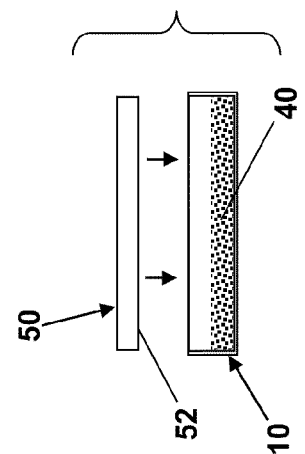
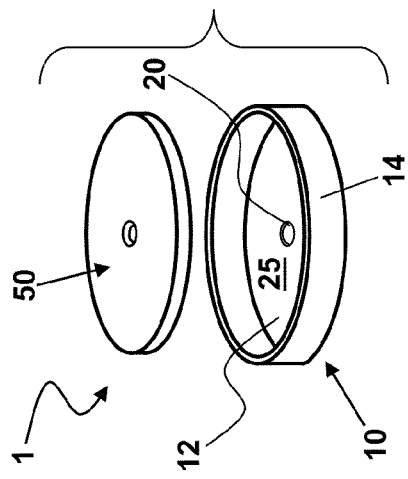
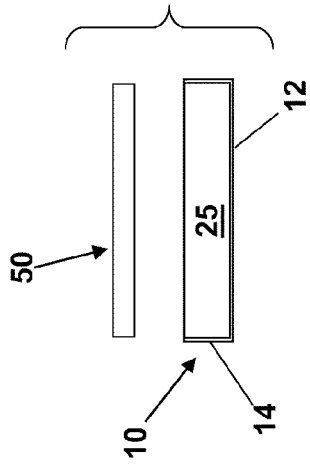

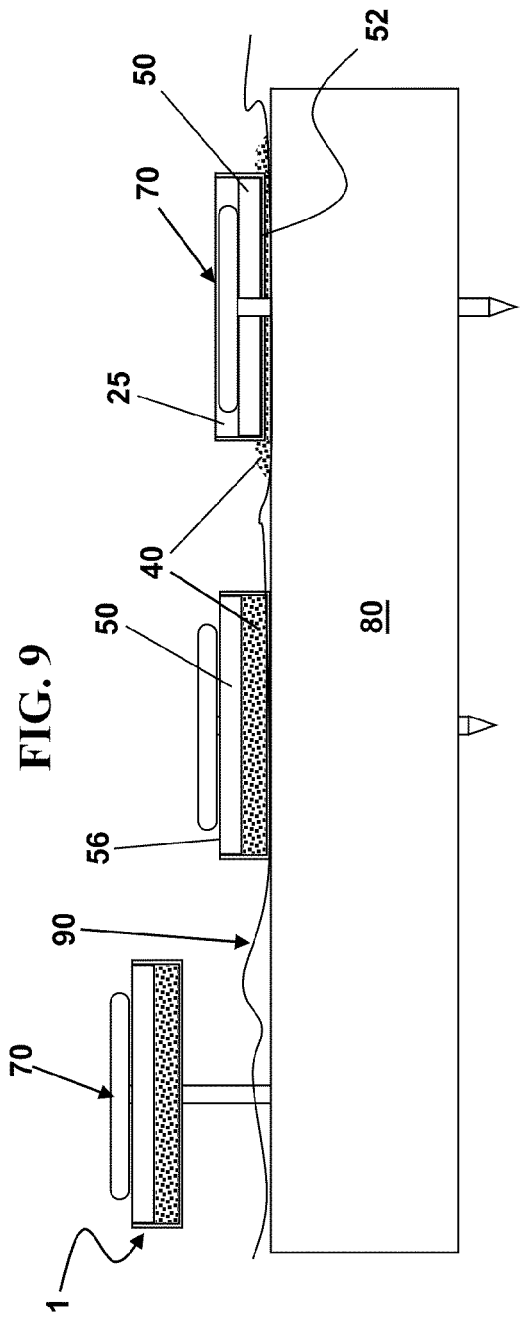
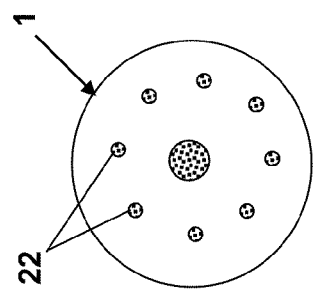
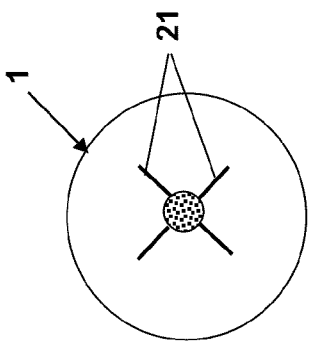

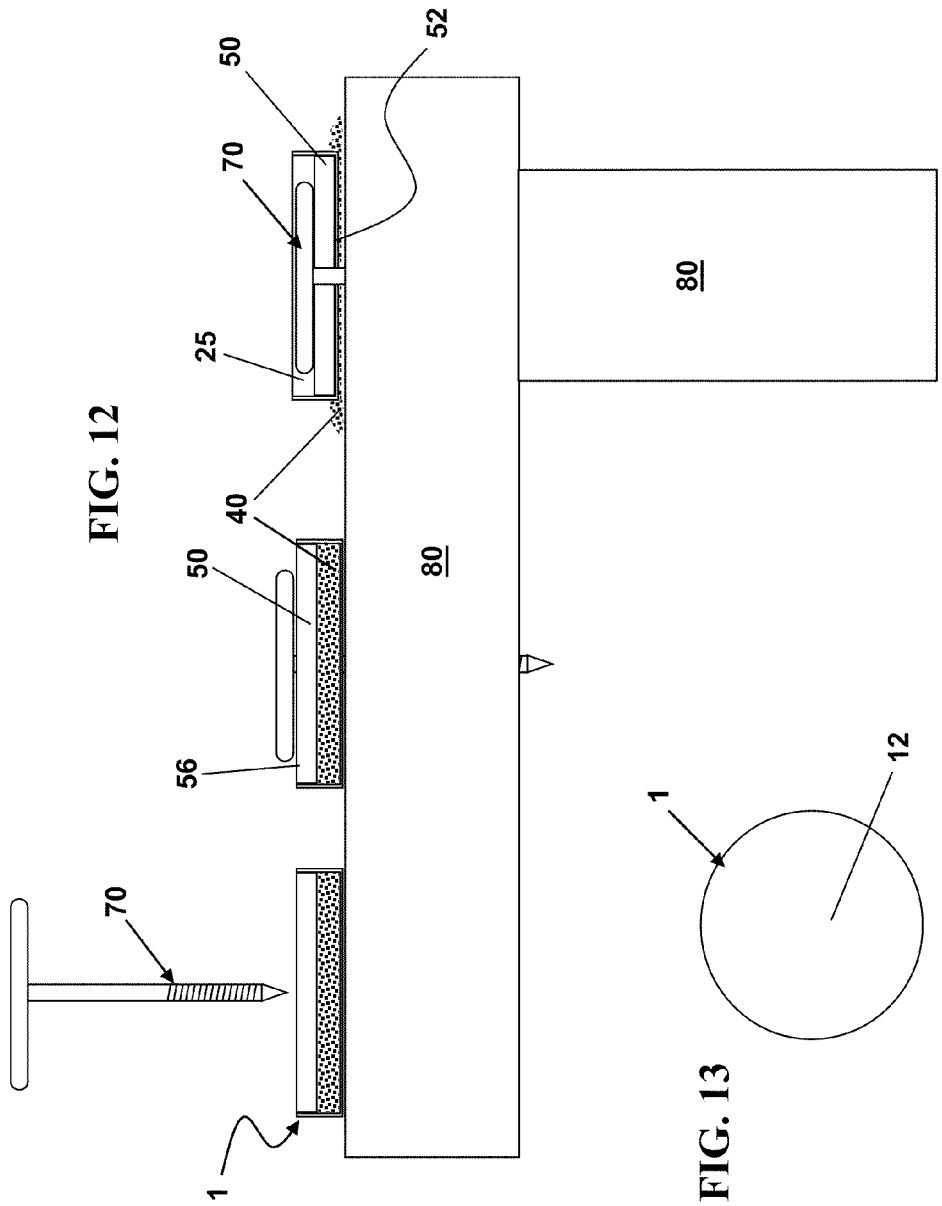

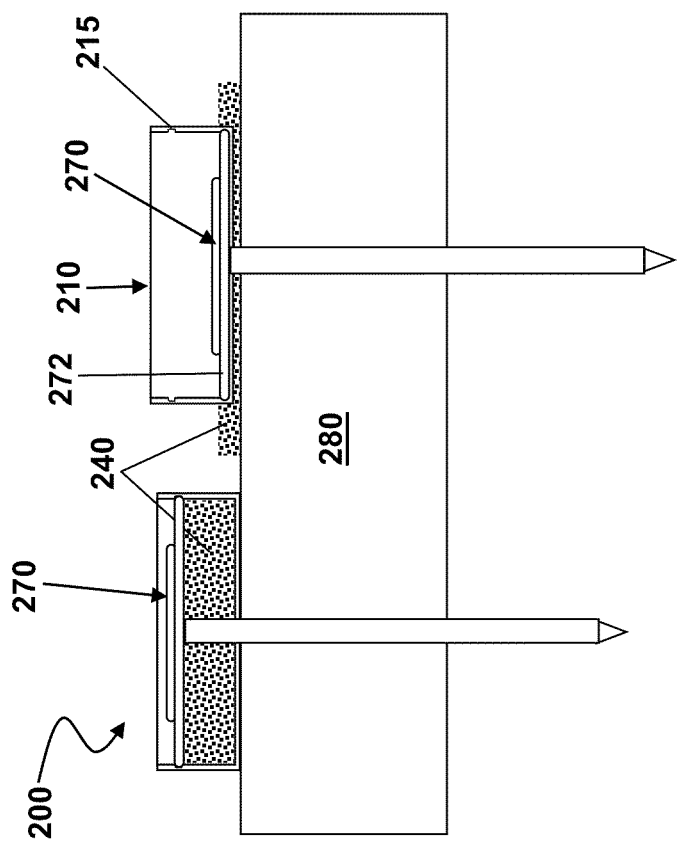

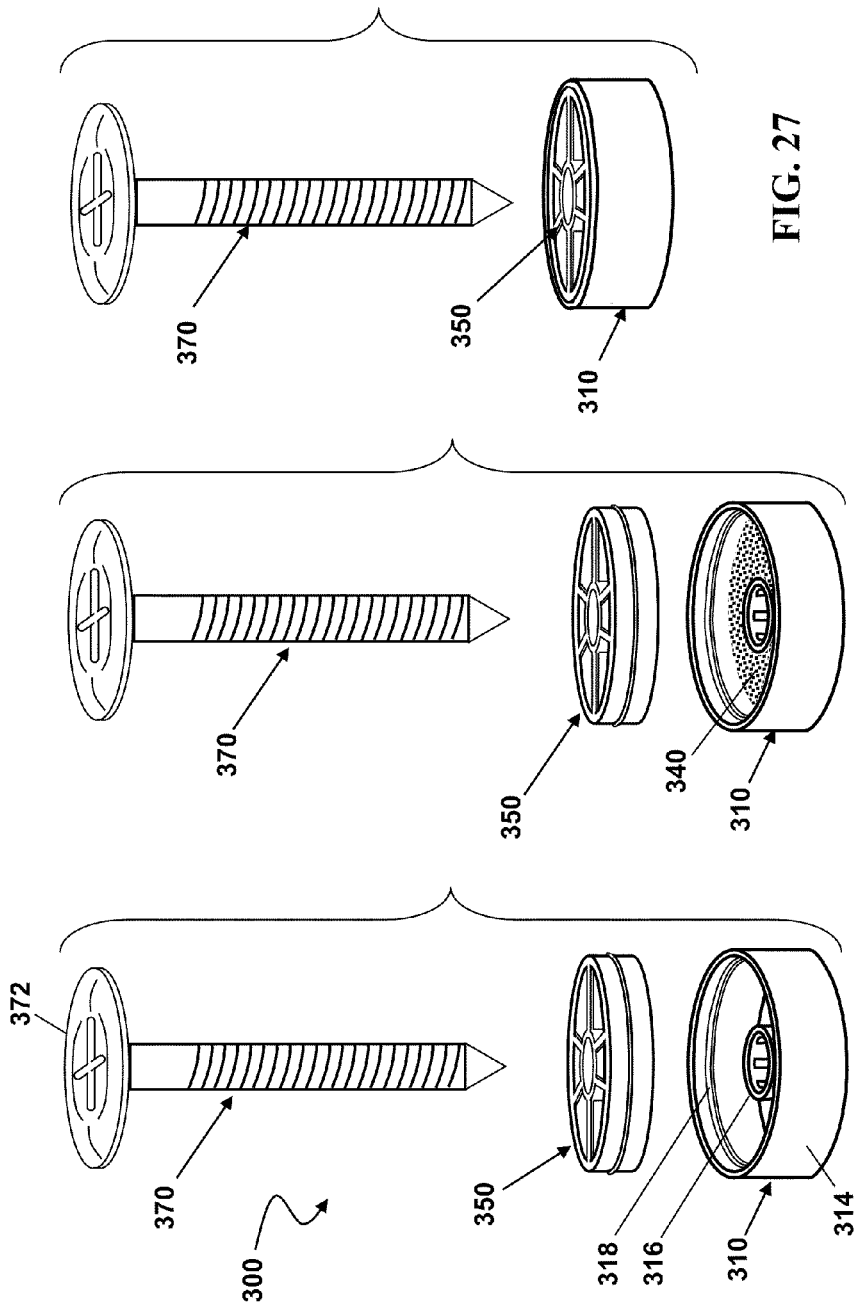

SELF SEALING ATTACHMENT ASSEMBLY

BACKGROUND

1. Field

The present disclosure relates generally to sealing products, and more particularly, to a self-sealing attachment assembly configured to provide a watertight seal to components used by the building industry for attaching building materials to the framing of a structure.

2. Background

In the building industry, sealing out water from penetrating to the interior surfaces of a structure is always desirable. Making structures watertight against rainwater, irrigation water, and any other moisture is a concern. Creating this seal against the effects of water may be accomplished, for example, by wrapping the exterior surfaces of a home in a building paper and fastening the paper to the framing of a home or other structure, or by providing an exterior surface, such as siding, roofing, or plaster lath, to protect the interior structure of the home. The point at which a building material, such as building paper or plaster lath, is fastened to the framing presents an opportunity for moisture to penetrate through the hole where the fastener, such as a nail, screw or bolt, extends into the framing. Penetration of moisture into the structural framing may mold, mildew, freeze, thaw, rot the wood, or cause other problems associated with waterproof exterior systems.

SUMMARY

One aspect of the disclosure, a self-sealing attachment assembly, includes a base portion defining a receptacle having an opening at one end and a surface with a through-hole at an opposite end, a sealant material in the receptacle, and a cover secured to the base portion and enclosing the opening, wherein the cover is configured to receive a driving force from a fastener and dispenses the sealant material via the through-hole by displacement through the receptacle when actuated by the driving force.

Another aspect of the disclosure, a self-sealing attachment assembly, includes a sealing assembly that includes a base portion defining a receptacle having an opening at one end and a surface with a through-hole at an opposite end, a sealant material in the receptacle, and a cover secured to the base portion and enclosing the opening, and a fastener having a head portion and a shank portion, the shank portion extending through the through-hole.

Another aspect of the disclosure, a self-sealing attachment assembly, includes a base portion comprising a retaining ring coupled to a containment structure, a fastener having a head and a shank portion, the fastener positioned in the base portion with the head abutting the retaining ring to define a receptacle having an opening at one end through which the shank portion extends, a sealant material in the receptacle, and a cover comprising an exit aperture, wherein the cover is secured to the base portion to enclose the receptacle opening with the shank extending through the exit aperture.

In another aspect of the disclosure, a self-sealing attachment assembly for a structure includes a building material mounted on framing for the structure, a sealing assembly, and a fastening member, wherein a cover of the sealing member is compressed by a head of the fastening member into a base portion of the sealing member to dispense the sealant material through a through-hole to seal a hole formed by the shank of the fastening member in the building material.

A method is disclosed for installing a building material to a framing that includes mounting a self-sealing attachment assembly onto a fastening member and driving the fastening member through the attachment assembly and the building material toward the framing so that a cover of the attachment assembly moves through a receptacle to dispense a sealant material to seal the penetration hole formed by the fastening member in the building material to form a watertight seal.

A method is disclosed for installing a building material to a framing that includes placing a self-sealing attachment assembly against the building material in a location aligned with a member of the framing and driving a fastening member toward the framing so that the head of the fastening member moves within a base portion to dispense the sealant material via an exit aperture in a cover to form a watertight seal surrounding a penetration hole formed by the fastening member in the building material.

BRIEF DESCRIPTION OF DRAWINGS

Various aspects of the present invention are illustrated by way of example, and not by way of limitation, in the accompanying drawings, wherein:

FIG. 1 illustrates a perspective view of a self-sealing attachment assembly in a preassembled configuration, in accordance with certain aspects of the present invention;

FIG. 2 illustrates a side sectional view of the self-sealing attachment assembly of FIG. 1, in accordance with certain aspects of the present invention;

FIG. 3 illustrates another perspective view of the self-sealing attachment assembly of FIG. 1, wherein a sealant is provided in a base portion of the assembly, in accordance with certain aspects of the present invention;

FIG. 4 illustrates a side sectional view of the self-sealing attachment assembly of FIG. 3, in accordance with certain aspects of the present invention;

FIG. 5 illustrates a perspective view of the self-sealing attachment assembly of FIG. 1 in an assembled configuration, in accordance with certain aspects of the present invention;

FIG. 6 illustrates a side sectional view of the self-sealing attachment assembly of FIG. 1 in an assembled configuration, in accordance with certain aspects of the present invention;

FIG. 9 illustrates a side view of a structural system with a self-sealing attachment assembly shown in various configurations, in accordance with certain aspects of the present invention;

FIG. 10 illustrates a bottom view of a self-sealing attachment assembly, wherein expansion slits are provided, in accordance with certain aspects of the present invention;

FIG. 11 illustrates a bottom view of a self-sealing attachment assembly, wherein exit apertures are provided, in accordance with certain aspects of the present invention;

FIG. 12 illustrates a side view of a structural system with a self-sealing attachment assembly shown in various configurations, in accordance with certain aspects of the present invention;

FIG. 13 illustrates a bottom view of a self-sealing attachment assembly, in accordance with certain aspects of the present invention;

FIG. 24 illustrates a side view of a structural system with a self-sealing attachment assembly shown in various configurations, in accordance with certain aspects of the present invention;

FIG. 25 illustrates a perspective view of a self-sealing attachment assembly in a preassembled configuration, in accordance with certain aspects of the present invention;

FIG. 26 illustrates another perspective view of the self-sealing attachment assembly of FIG. 25, wherein a sealant is provided in a receptacle of the assembly, in accordance with certain aspects of the present invention;

FIG. 27 illustrates a perspective view of the self-sealing attachment assembly of FIG. 25 in an assembled configuration, in accordance with certain aspects of the present invention;

DETAILED DESCRIPTION

Figure 8:
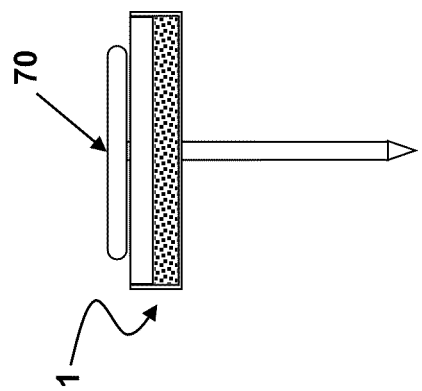
FIG. 8 illustrates a side sectional view of a self-sealing attachment assembly mounted on a fastening member, in accordance with certain aspects of the present invention.

Various aspects of a self-sealing attachment assembly may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of a self-sealing attachment assembly in addition to the orientation depicted in the drawings. By way of example, if a self-sealing attachment assembly in the drawings is turned over, elements described as being on the "bottom" side of the other elements would then be oriented on the "top" side of the other elements. The term "bottom" can therefore encompass both an orientation of "bottom" and "top" depending on the particular orientation of the apparatus.

Various aspects of a self-sealing attachment assembly may be illustrated with reference to one or more exemplary embodiments. As used herein, the term "exemplary" means "serving as an example, instance, or illustration," and should not necessarily be construed as preferred or advantageous over other embodiments of a self-sealing attachment assembly disclosed herein.

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details.

FIGS. 1-6 illustrate the configuration of an exemplary self-sealing attachment assembly 1 in various stages of assembly. As shown in FIGS. 1 and 2, the assembly 1 may include a base portion 10 and a cover 50. The base portion 10 and the cover 50 may individually be composed of a plastic, such as a high-density polyethylene (HDPE) or high-density polypropylene (HDPP), or any other suitable material, including nylon, rubber, fiberglass, wood, or metal. The base portion 10 may be formed with a lower plate 12 coupled to a containment structure 14, which may be an integrally formed annular side wall, for example. A through-hole 20 may be provided in the lower plate 12. The lower plate 12 and containment structure 14 define a receptacle 25 for containment of a sealant material 40. As shown in FIGS. 3 and 4, the sealant material 40, which may be a caulking material such as a silicone or urethane caulking, butyl rubber, tar, or some other suitable waterproofing material, may be loaded directly into the receptacle 25. The through-hole 20 may be formed with dimensions that, in combination with the viscosity of the sealant material, prevent the unintended release of the sealant material 40 from the receptacle 25 unless an applied force actuates the release. In another aspect according to the present invention, the sealant 40 may be provided in a sealant casing, which, for example, may be a thin, flexible, rupturable material like that of plastic wrap or a plastic bag.

With the sealant material 40 provided in the receptacle 25, the cover 50 may be securely coupled with the base portion 10 to enclose an open side of the receptacle 25. For example, the containment structure 14 may be interference fit or co-molded in a manner to encompass the cover 50 with zero clearance between the cover 50 and the inner side surfaces of the containment structure 14. In another variation in accordance with aspects of the present invention, a securing mechanism, such as an adhesive, or a tongue and groove feature, for example, may secure the cover 50 in a position to effectively enclose the receptacle 25 while preventing unintentional actuation of the assembly during transport and/or storage.

FIGS. 5 and 6 illustrate an assembled self-sealing attachment assembly 1. The cover 50 is securely coupled to the base portion 10, preferably enclosing the sealant material 40 in that portion of the receptacle 25 not occupied by the cover 50. An access hole 54 may be provided in the cover 50 to enhance the alignment and access of a fastener to be used with the assembly 1. The dimensions of the assembly 1 may be varied in many ways to accommodate different configurations and sizes of fasteners, as well as to provide for different types and/or amounts of caulking in accordance with sealing requirements for differing fastening conditions. For example, although depicted as round, the assembly may be manufactured to be any shape. Furthermore, the depth and dimensions of the receptacle 25, thickness of the cover 50, thickness of the containment structure 14, and the thickness of the lower plate 12, for example, may be varied in accordance with the material comprising the base portion 10 and/or cover 50 in order to provide the desired strength and/or rigidity of the individual components to ensure the effective release of the sealant material 40 as intended (e.g., without unintended rupture). In accordance with another aspect of the present invention, the base portion 10 and/or the cover 50 may be made pliable to intentionally enable collapse, depending upon the application. In accordance with yet another aspect of the present invention, a releasable liner (not shown) may be provided on an upper surface 56 of the cover 50 and/or the lower surface of the lower plate 12 to seal respectively the access hole 54 and/or through-hole 20.

Figure 7:
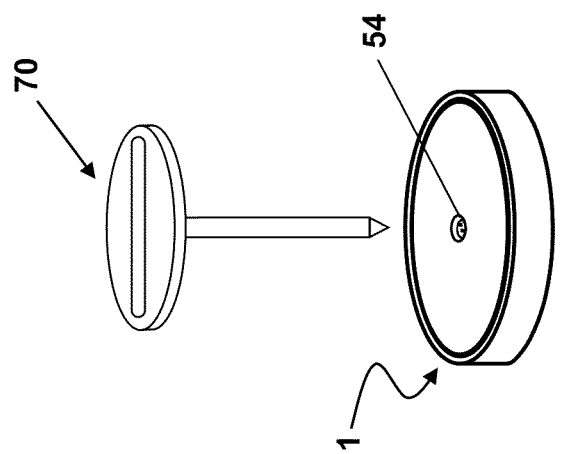
FIG. 7 illustrates a perspective view of a fastening member and a self-sealing attachment assembly, in accordance with certain aspects of the present invention.

In use, as shown in FIGS. 7-8, the self-sealing attachment assembly 1 may be installed over a fastener 70 of any type, such as a screw, nail, and/or bolt (self-tapping or other), by extending the fastener through the access hole 54 and through-hole 20. As shown in FIG. 9 in various degrees of insertion, with an assembly 1 mounted thereon, a fastener 70 may be driven (or tightened in the case of a nut and bolt) into a structural member 80 to attach a building material 90, such as a waterproof building paper, plywood, or a plaster lath, for example, to the structure of a home. The structural member 80 may be a stud or a plywood member, for example. The fastener 70 may be driven or tightened to wedge the assembly 1 against the building material 90 with the head of the fastener 70 abutting the upper surface 56 of the cover 50. Continued driving or tightening of the fastener 70 applies a distributed force from the head of the fastener to the upper surface 56 of the cover 50. The distributed force, in turn, drives the cover 50 further into the receptacle 25. As discussed previously, the cover 50 may be designed with a uniform bottom surface 52 having dimensions to prevent escape of the sealant material 40 from the receptacle 25 other than through features provided in the lower plate 12, such as the through-hole 20 (see also FIGS. 10 and 11, which show respectively expansion slits 21 and exit apertures 22 as exemplary features that may be provided to direct and/or control the escape of the sealant material 40 from the receptacle 25 through the lower plate 12). Thus, driving the cover 50 into the receptacle 25 forces a displacement of the enclosed sealant material 40 out of the through-hole 20 and into the area surrounding the penetration hole formed by the fastener 70 entering the building material 90. The sealant material 40 will cover effectively around the hole to also provide a seal against enlargements of the hole as a result of movement of the construction material 90 during installation, for example, or due to an oversized hole initially provided compared to the size of the fastener 70 being used.

As shown in FIGS. 12 and 13, the self-sealing attachment assembly 1 may be formed without a through-hole 20 in the lower plate 12 and/or an access hole 54 in the cover 50. For example, a fastener 70 that is self-tapping may be driven directly through the cover 50 and/or directly through the lower plate 12. When actuated as described above, the sealant material 40 may be forced out through the hole in the lower plate 12 created by the self-tapping fastener 70. And although FIG. 9 illustrates fastening a building material 90 between the fastener sealing assembly 70 and a structural member 80, as shown in FIG. 12 the fastener 70 may be used directly against a structural member for fastening to another structural member or for fastening a building material to the opposite side of the stud 80.

Figure 14:
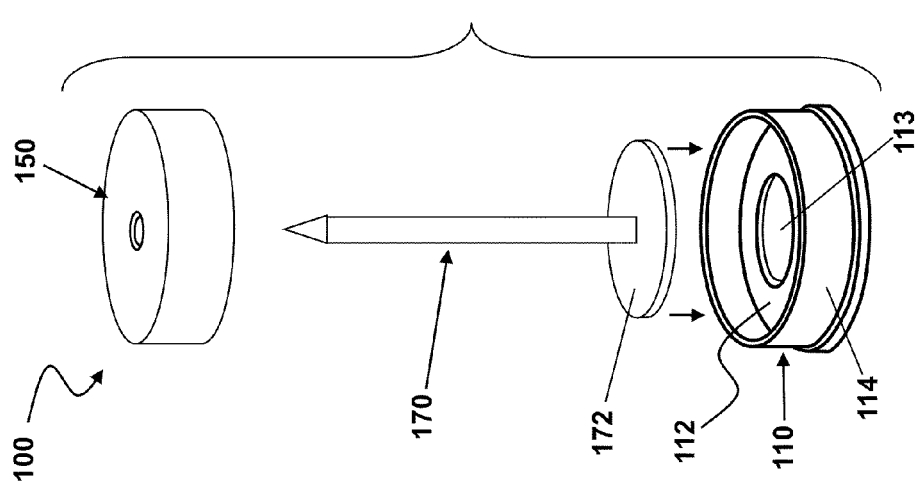
FIG. 14 illustrates a perspective view of a self-sealing attachment assembly in a preassembled configuration, in accordance with certain aspects of the present invention.

FIGS. 14-18 illustrate another exemplary self-sealing attachment assembly. As shown in FIG. 14, the assembly 100 may include a base portion 110, a cover 150, and an integrated fastening member 170. The base portion 110 and the cover 150 may individually be composed of a plastic, such as a high-density polyethylene (HDPE) or high-density polypropylene (HDPP), or any other suitable material, including nylon, rubber, fiberglass, wood, or metal. The fastener member 170 may be a fastener of any type, such as a screw, nail, and/or bolt (self-tapping or other), for example.

The base portion 110 may be formed with a retaining ring 112 coupled to a containment structure 114, which may be an integrally formed annular side wall, for example. The fastener member 170 may slide into the base portion 110 so that a head 172 abuts the retaining ring 112 with the shank portion of the fastener member extending out through an opening in the containment structure 114. The containment structure 114 may be interference fit, for example, to encompass the head 172 with zero clearance between the head 172 and the inner side surfaces of the containment structure 114. With the fastening member 172 thus seated in the base portion 110, the head 172 effectively seals an access hole 113 formed at the center of the retaining ring 112 and prevents fluid communication through the access hole 122 from a receptacle 125 defined by the interior of the containment structure 140 and the head 172 of the fastener member 170. A washer may be provided to further enhance the seal.

Figure 15:
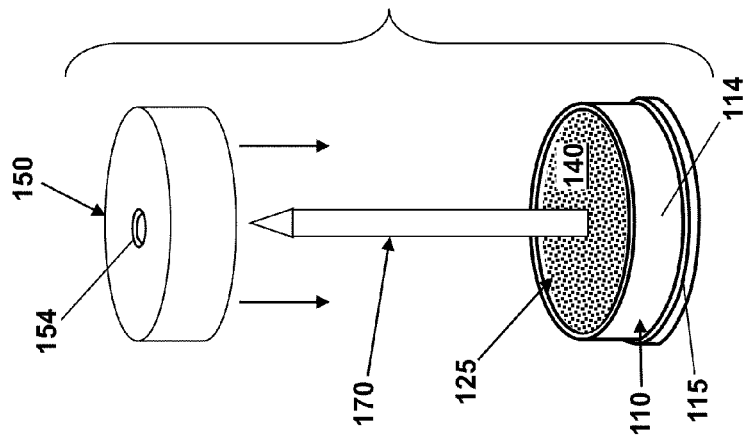
FIG. 15 illustrates another perspective view of the self-sealing attachment assembly of FIG. 14, wherein a sealant is provided in a receptacle of the assembly, in accordance with certain aspects of the present invention.

As shown in FIG. 15, a sealant material 140, which may be a caulking material such as a silicone or urethane caulking, butyl rubber, tar, or some other suitable waterproofing material, may be loaded directly into the receptacle 125. In another aspect according to the present invention, the sealant 140 may be provided in a sealant casing, which, for example, may be a thin, flexible, rupturable material like that of plastic wrap or a plastic bag. With the sealant material 140 provided in the receptacle 125, the cover 150 may be securely coupled with the base portion 110 by sliding an exit aperture 154 in the cover 150 over the shank of the fastener member 170 until the cover 150 seats against an annular lip 115 provided in the base portion 110. The cover 150 may be secured to the containment structure by interference fit or via a securing mechanism, such as an adhesive, for example, effectively enclosing the receptacle 125.

Figure 16:
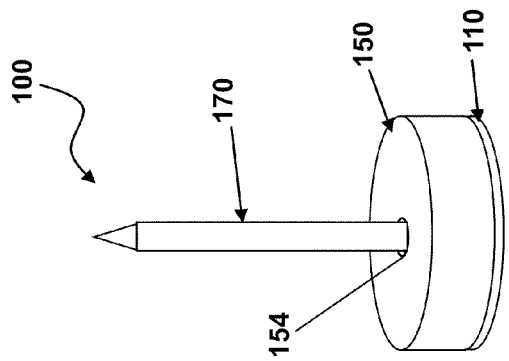
FIG. 16 illustrates a perspective view of the self-sealing attachment assembly of FIG. 15 in an assembled configuration, in accordance with certain aspects of the present invention.
Figure 18:
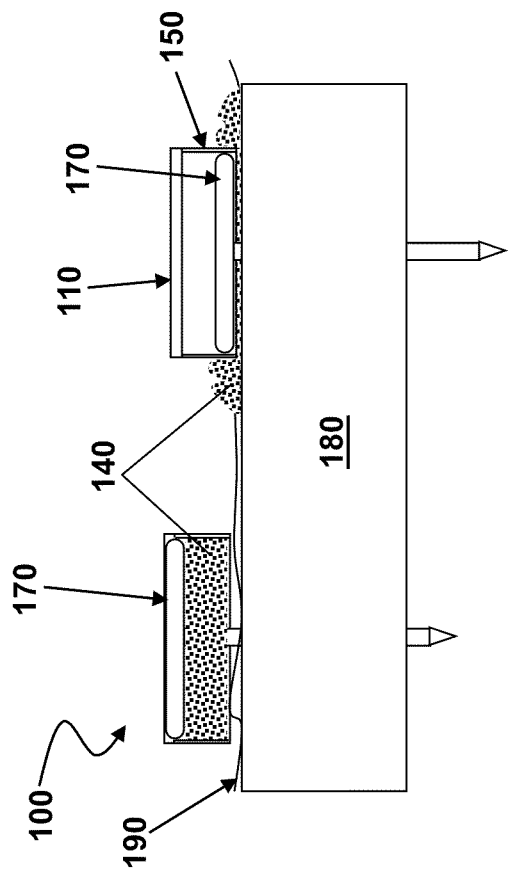
FIG. 18 illustrates a side view of a structural system with a self-sealing attachment assembly shown in various configurations, in accordance with certain aspects of the present invention.
Figure 17:
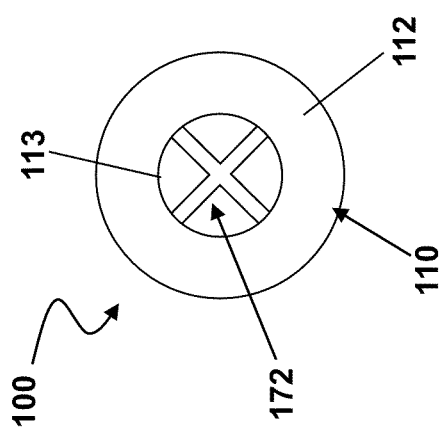
FIG. 17 illustrates a bottom view of the self-sealing attachment assembly of FIG. 16, in accordance with certain aspects of the present invention.

FIG. 16 illustrates an assembled self-sealing attachment assembly 100. The cover 150 is securely coupled to the base portion 110, enclosing the sealant material 140 in the receptacle 125. The dimensions of the assembly 100 may be varied in many ways to accommodate different configurations and sizes of fastener members, as well as to provide for different types and/or amounts of caulking in accordance with sealing requirements for differing fastening conditions. In use, as shown in FIG. 17, access to the head of the fastener member 170 may be provided through the access hole 113 in the center of the retaining ring 112. Thus, as shown in FIG. 18, the self-sealing fastening assembly 100 may be driven (or tightened in the case of a nut and bolt) into a structural member 180 to attach a construction material 190, such as a waterproof building paper, plywood, or a plaster lath, for example, to a structure. The structural member 180 may be a stud or a plywood member, for example. The fastener 170 may be driven or tightened until an upper surface of the cover 150 of the assembly 100 abuts against the construction material 190. Continued driving or tightening of the fastener 170 causes the head of the fastener to continue to displace through the receptacle 125, forcing a displacement of the enclosed sealant material 140 out of the exit aperture 154 and into the area surrounding the penetration hole formed by the fastener 170 entering the construction material 190. The sealant material 140 will cover effectively around the hole to also provide a seal against enlargements of the hole as a result of movement of the construction material 190 during installation, for example, or due to an oversized hole initially provided compared to the size of the fastener 170 being used.

Figure 19:
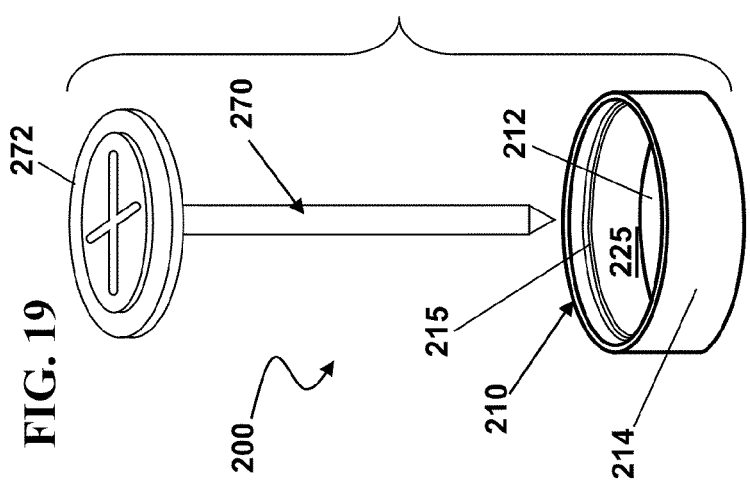
FIG. 19 illustrates a perspective view of a self-sealing attachment assembly in a preassembled configuration, in accordance with certain aspects of the present invention.

FIGS. 19-24 illustrate yet another exemplary self-sealing attachment assembly. As shown in FIG. 19, the assembly 200 may include a base portion 210 and a fastening member 270. The base portion 210 may be composed of a plastic, such as a high-density polyethylene (HDPE) or high-density polypropylene (HDPP), or any other suitable material, including nylon, rubber, fiberglass, wood, or metal. The fastener member 270 may be a fastener of any type, such as a screw, nail, and/or bolt (self-tapping or other), for example.

Figure 21:
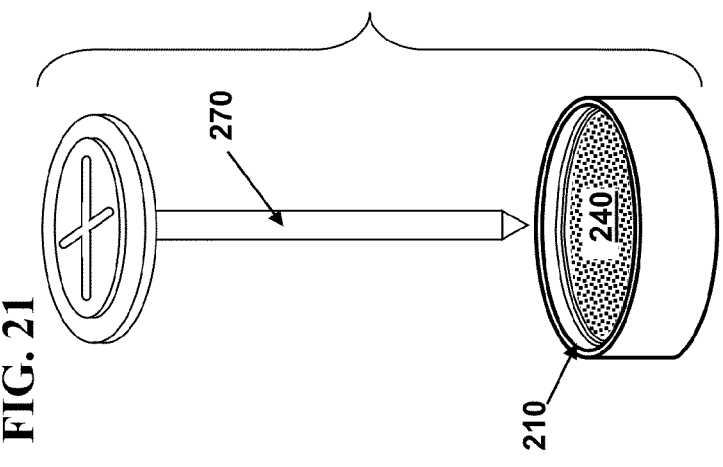
FIG. 21 illustrates another perspective view of the self-sealing attachment assembly of FIG. 19, wherein a sealant is provided in a receptacle of the assembly, in accordance with certain aspects of the present invention.
Figure 22:
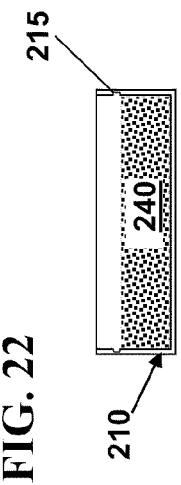
FIG. 22 illustrates a perspective view of the base portion of the self-sealing attachment assembly of FIG. 19, wherein a sealant is provided in a receptacle of the assembly, in accordance with certain aspects of the present invention.
Figure 20:
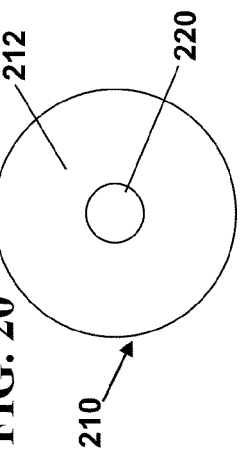
FIG. 20 illustrates a bottom view of a base portion of the self-sealing attachment assembly, in accordance with certain aspects of the present invention.

The base portion 210 may be formed with a lower plate 212 coupled to a containment structure 214, which may be an integrally formed annular side wall, for example. Accordingly, the lower plate 212 and containment structure 214 define a receptacle 225 for containment of a sealant material 240. A recessed channel 215 may be provided on an inner surface of the containment structure 214 for coupling the fastener member 270 to the base portion 210. For example, the fastener member 270 may be formed with a head structure that includes a head plate 272, and the containment structure 214 may be interference fit, for example, to encompass the head plate 272 with zero clearance between the head plate 272 and the inner side surfaces of the containment structure 214. A through-hole 220, as shown in FIG. 20, may be provided in the lower plate 212. As shown in FIGS. 21 and 22, the sealant material 240, which may be a caulking material such as a silicone or urethane caulking, butyl rubber, tar, or some other suitable waterproofing material, may be loaded directly into the receptacle 225. In another aspect according to the present invention, the sealant 240 may be provided in a sealant casing, which, for example, may be a thin, flexible, rupturable material like that of plastic wrap or a plastic bag.

Figure 23:
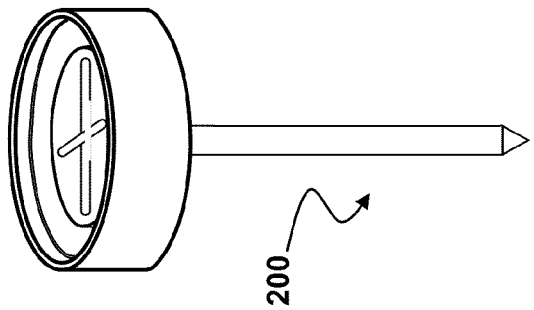
FIG. 23 illustrates a perspective view of the self-sealing attachment assembly of FIG. 19 in an assembled configuration, in accordance with certain aspects of the present invention.

With the sealant material 240 provided in the receptacle 225, the fastener member 270 may be securely coupled with the base portion 110 by sliding the shank of the fastener member 270 through the receptacle 225 and the through-hole 220 until the head plate 272 is press fit, for example, into the recessed channel 215, as shown in FIGS. 23 and 24. With the head plate 272 thus secured, the sealant material 240 is effectively enclosed and secured in the receptacle 225, and the integrated self-sealing attachment assembly 200 is ready for use. Additionally, the through-hole 220 may be formed with dimensions that, in combination with the viscosity of the sealant material and the shank of the fastener member 270, prevent the unintended release of the sealant material 240 from the receptacle 225 unless an applied force actuates the release by unseating the head plate 272 from the recessed channel 215.

FIG. 23 illustrates an assembled self-sealing attachment assembly 200. The fastener member 270 is securely coupled to the base portion 210, enclosing the sealant material 240 in the receptacle 225. The dimensions of the assembly 200 may be varied in many ways to accommodate different configurations and sizes of fastener members, as well as to provide for different types and/or amounts of caulking in accordance with sealing requirements for differing fastening conditions.

In use, as shown in FIG. 24, the self-sealing attachment assembly 200 may be driven (or tightened in the case of a nut and bolt) into a structural member 280 to attach a construction material, for example, such as a waterproof building paper, plywood, or a plaster lath, to a structure or to attach various structural components directly to one another. The structural member 280 may be a stud or a plywood member, for example. The fastener member 270 may be driven or tightened so that the head plate 272 disengages from the recessed channel 215 and slides through the receptacle 225, forcing a displacement of the enclosed sealant material 140 out of the through-hole 220 and into the area surrounding the penetration hole formed by the fastener 270 entering the structural member 280, for example. The head plate 272 is preferably designed with a uniform bottom surface having dimensions to prevent escape of the sealant material 240 from the receptacle 225 other than through features provided in the lower plate 212, such as the through-hole 220. The sealant material 240 will cover effectively around the hole to also provide a seal against enlargements of the hole as a result of movement of the structural member 280 during installation, for example, or due to an oversized hole initially provided compared to the size of the fastener 270 being used. Additional exemplary features, including expansion slits, exit apertures, depressions or channels may be provided on a lower surface of the lower plate 212 to direct and/or control the escape of the sealant material 240 from the receptacle 225 while providing increased surface area, for example, for increasing the strength of the bond between the attachment assembly 200 and the structural member 280.

FIGS. 25-39 illustrate another exemplary self-sealing attachment assembly, in accordance with aspects of the present invention. As shown in FIGS. 25-27, the assembly 300 may include a base portion 310, a piston member 350, and a fastener member 370. The base portion 310 and the piston member 350 may be composed of a plastic, such as a high-density polyethylene (HDPE) or high-density polypropylene (HDPP), or any other suitable material, including nylon, rubber, fiberglass, wood, or metal. The fastener member 370 may be a fastener of any type, such as a screw, nail, and/or bolt (self-tapping or other), for example. A sealant material 340, which may be a caulking material such as a silicone or urethane caulking, butyl rubber, tar, or some other suitable waterproofing material, may be loaded directly into the base portion 310 and secured therein by the piston member 350 until released by an applied force on the piston member 350 through actuation of the fastener member 370.

Figure 29:
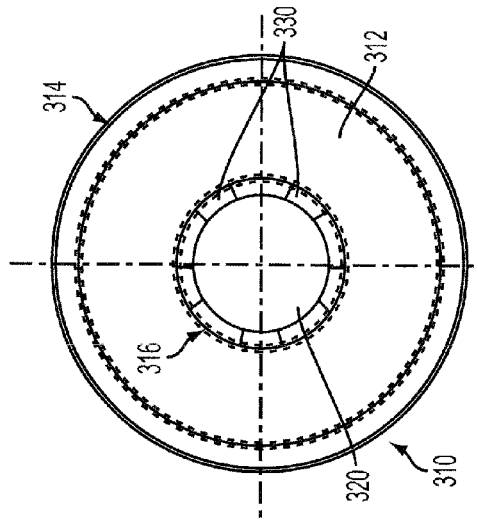
FIG. 29 is a bottom view of the base portion of FIG. 28, in accordance with certain aspects of the present invention.
Figure 30:
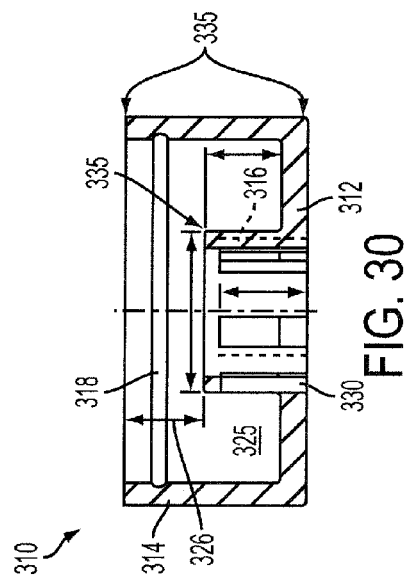
FIG. 30 is a sectional view taken along line A-A of the base portion of FIG. 28, in accordance with certain aspects of the present invention.
Figure 28:
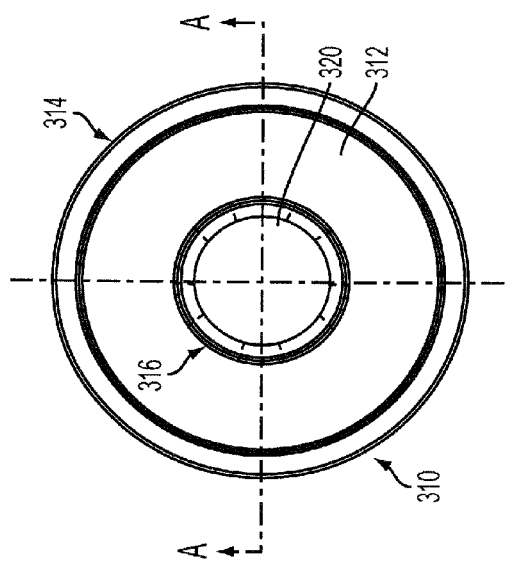
FIG. 28 is a top view of an exemplary base portion of the self-sealing attachment assembly of FIG. 25, in accordance with certain aspects of the present invention
Figure 32:
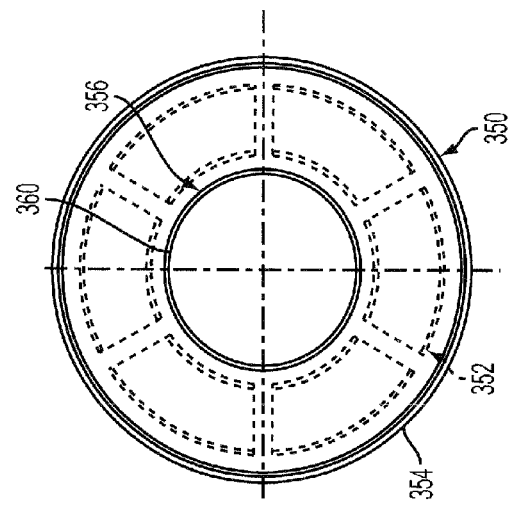
FIG. 32 is a bottom view of the piston member of FIG. 31, in accordance with certain aspects of the present invention.
Figure 31:
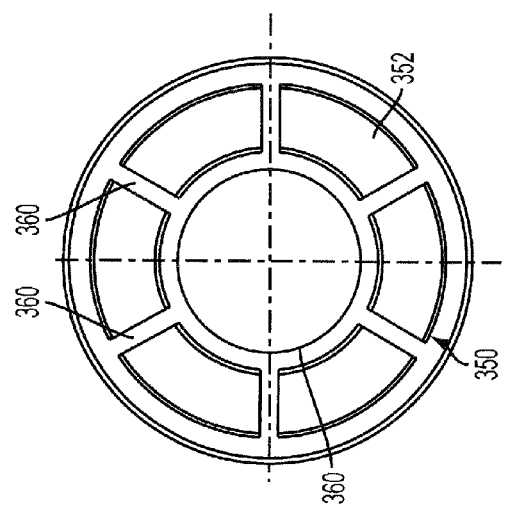
FIG. 31 is a top view of an exemplary piston member of the self-sealing attachment assembly of FIG. 25, in accordance with certain aspects of the present invention
Figure 33:
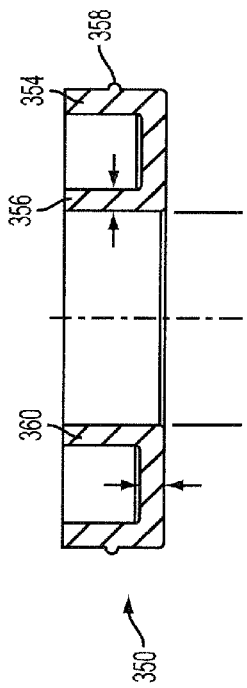
FIG. 33 is a sectional view taken along line A-A of the piston member of FIG. 31, in accordance with certain aspects of the present invention.

As shown in isolation in FIGS. 28-30, the base portion 310 may be integrally formed with an annular lower plate 312 that concentrically joins a cylindrical outer wall 314 and a cylindrical inner wall 316. The cylindrical inner wall 316 may be formed to have a shorter height dimension than that of the cylindrical outer wall 314. Accordingly, an annular receptacle 325 for containment of a sealant material 340 may be defined by the space between the annular lower plate 312 and the concentric outer and inner walls, 314 and 316. A through-hole 320 may be provided in the lower plate 312 to provide communication between an exterior of the base 310 and a piston retaining space 326 via the interior of the inner wall 316, the piston retaining space 326 being defined by an area interior to the outer wall 314 and above the upper surface of the inner wall 316. A securing means, such as a recessed channel 318 on an inner surface of the outer wall 314, may be provided in the piston retaining space 326 for coupling the piston member 350 to the base portion 310. Exit channels 330 may be provided at intervals along portions of the inner wall 316 that extend through the base plate 312 and provide communication from the receptacle 325 to the exterior of the base portion 310. For example, as shown in FIGS. 28-30, each exit channel 330 may be formed along a 30 degree arc of the inner wall 316 and spaced apart from neighboring exit channels by a 30 degree arc of the inner wall on each side. In another aspect according to the present invention, the inner wall 316 may be a solid cylinder and exit apertures, for example, may be formed through the lower plate 312 to provide communication between the receptacle 325 and the exterior of the base portion 310. As illustrated in FIG. 30, for example, edges of the inner and outer walls, 314 and 316, may be provided with chamfers 335 to, for example, allow easier manipulation of sliding parts, prevent damage of assembled parts, and/or prevent ripping or tearing of materials that may be placed in contact with the assembly 300 during or after application.

As shown in FIG. 26, with the sealant material 340 provided in the receptacle 325, the piston member 350 may be securely coupled with the base portion 310 to enclose an open side of the receptacle 325. For example, as shown in isolation in FIGS. 31-33, the piston member 350 may be formed with a uniform, annular lower surface 352 that joins concentric inner and outer piston walls, 354 and 356, respectively. Support members 360 may extend between the walls 354 and 356 to provide a more consistent and distributed load bearing structure in order to maintain the integrity of the piston member 350 during actuation. Configuring the piston member 350 to be substantially hollow provides for a lighter design. In another aspect in accordance with the present invention, the piston member 350 may be a solid annular piston. The piston member 350 may be formed with an annular bead 358 to engage the recessed channel 318 in the base portion 310 for securing the piston member 350 to the base portion 310 while enclosing the sealant material 340 in the receptacle 325.

Figure 34:
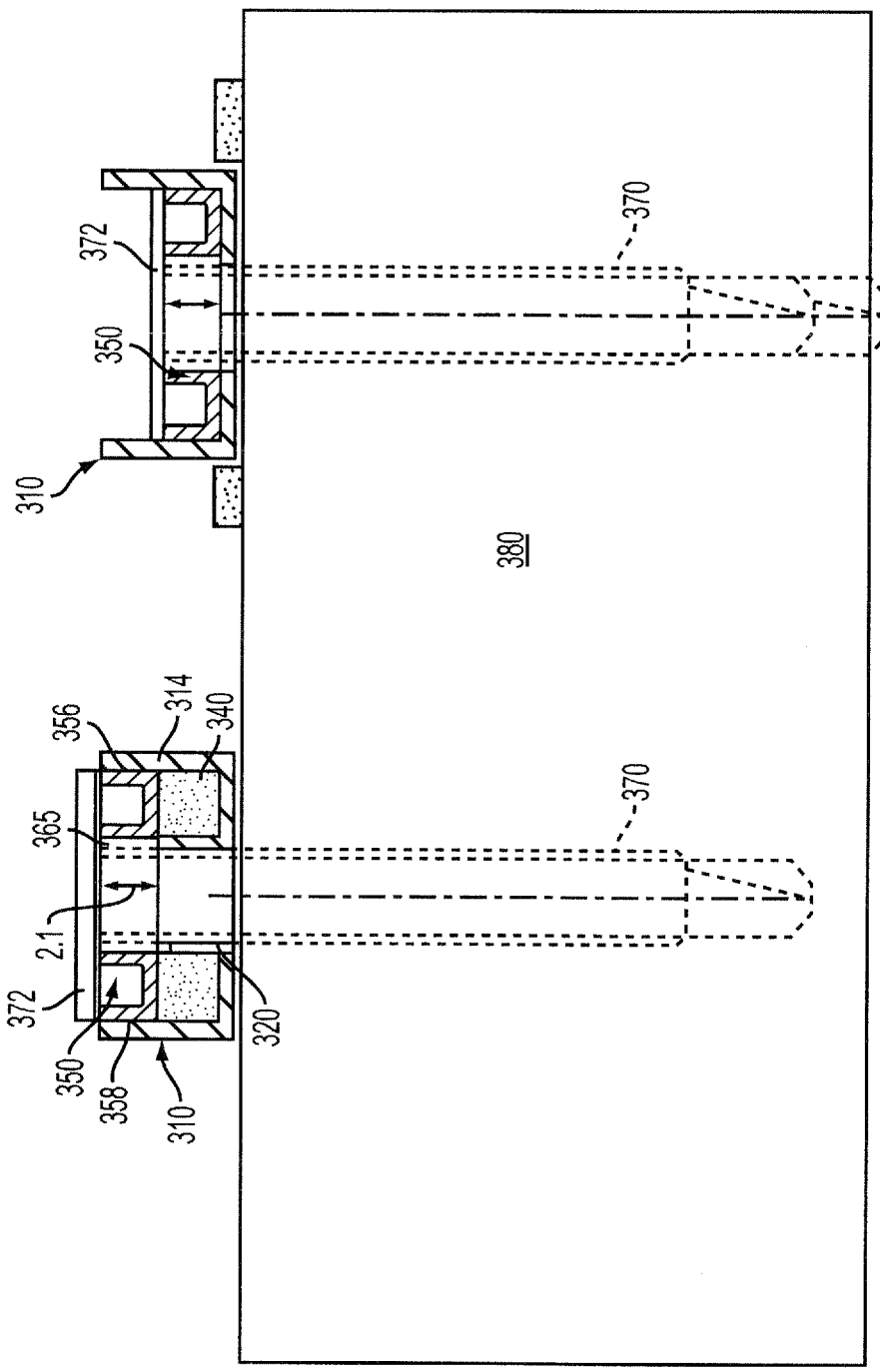
FIG. 34 illustrates a side view of a structural system with the self-sealing attachment assembly of FIG. 25 shown in various configurations, in accordance with certain aspects of the present invention.
Figure 35:
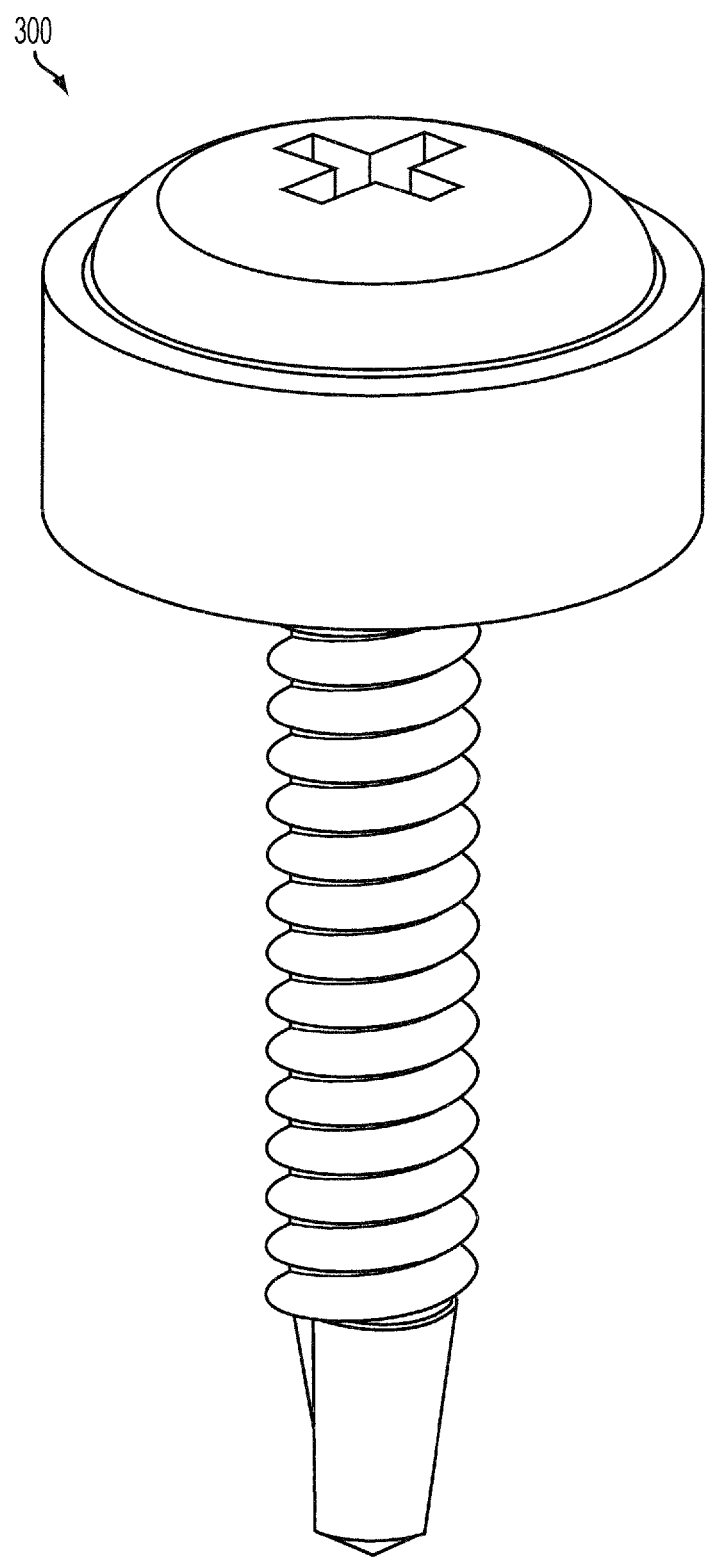
FIG. 35 illustrates a perspective view of a self-sealing attachment assembly in an assembled configuration, in accordance with certain aspects of the present invention.
Figure 36:
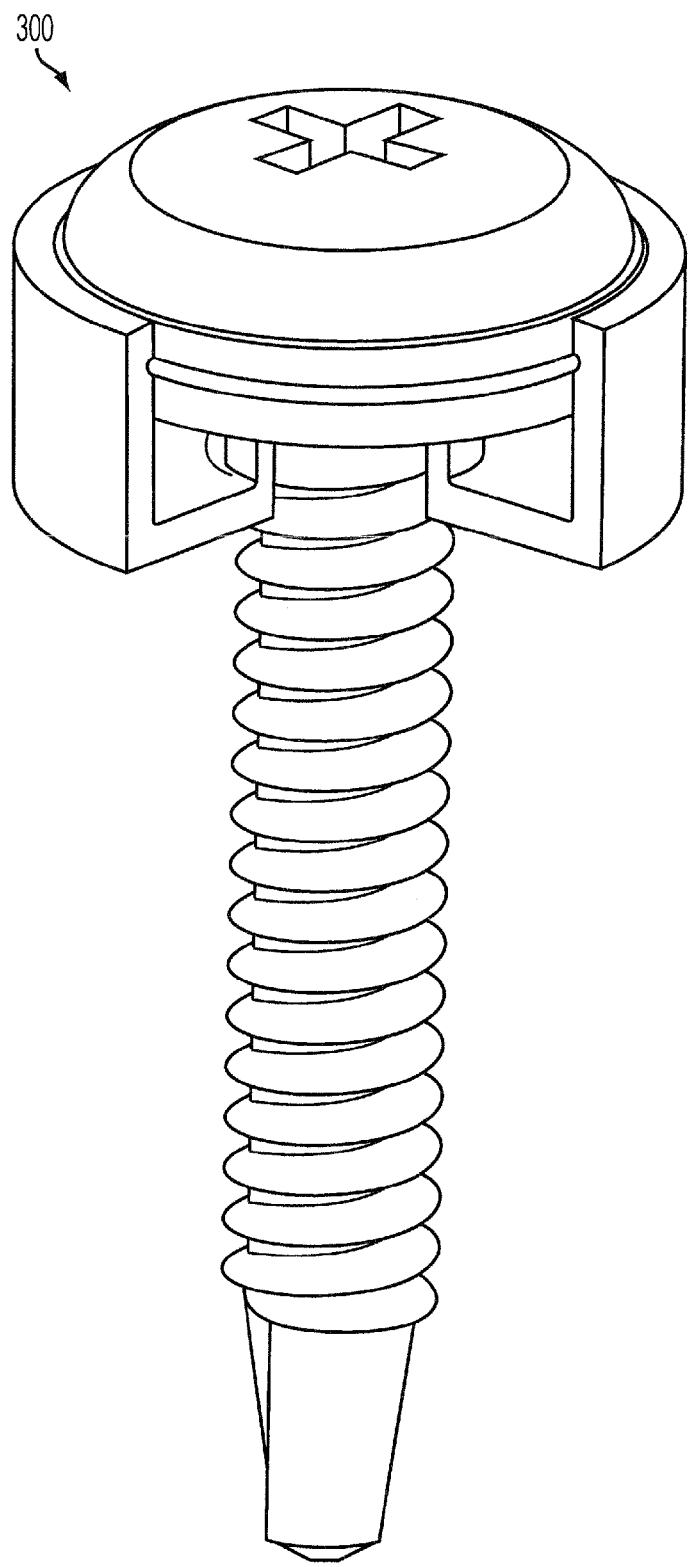
FIG. 36 illustrates a partial cutaway of a top perspective view of a self-sealing attachment assembly in an assembled configuration, in accordance with certain aspects of the present invention.
Figure 37:
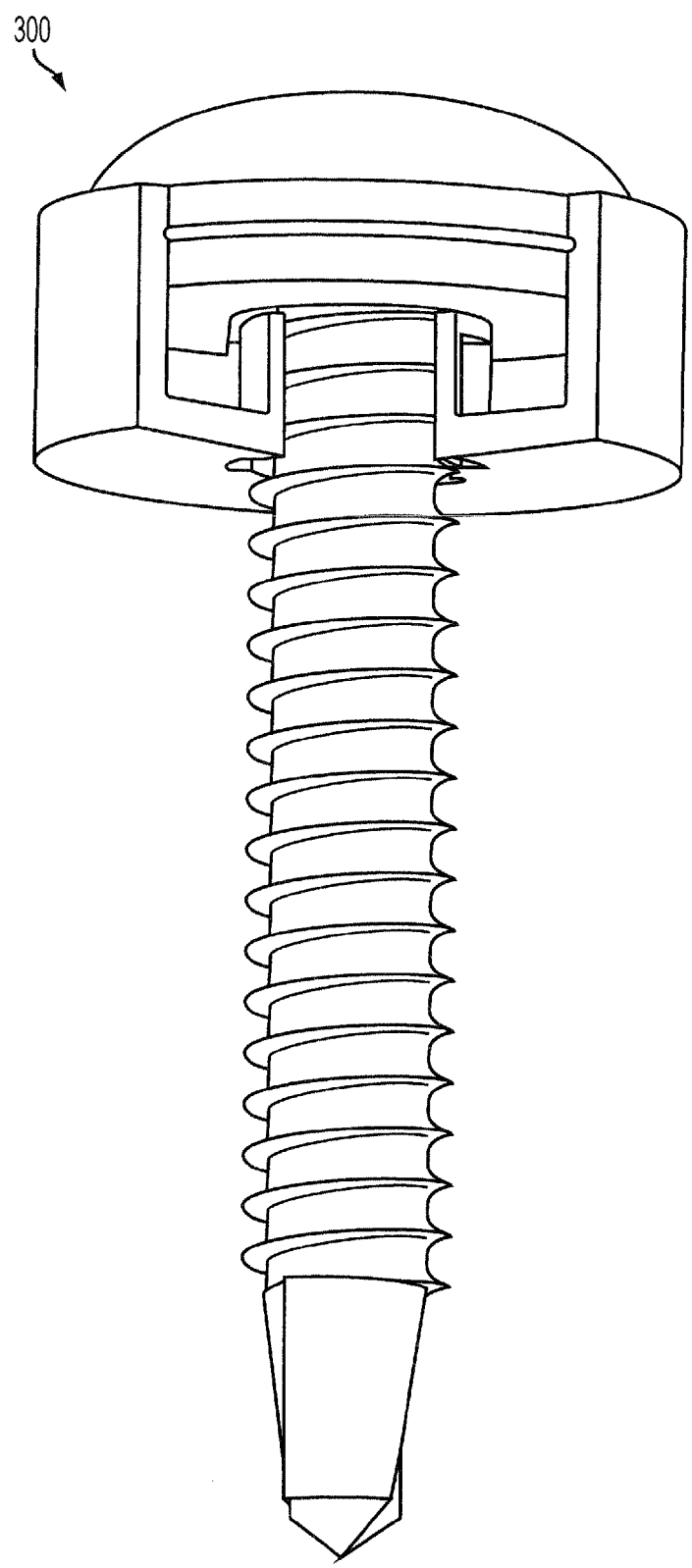
FIG. 37 illustrates a partial cutaway view of a bottom perspective view of a self-sealing attachment assembly in an assembled configuration, in accordance with certain aspects of the present invention.
Figure 38:
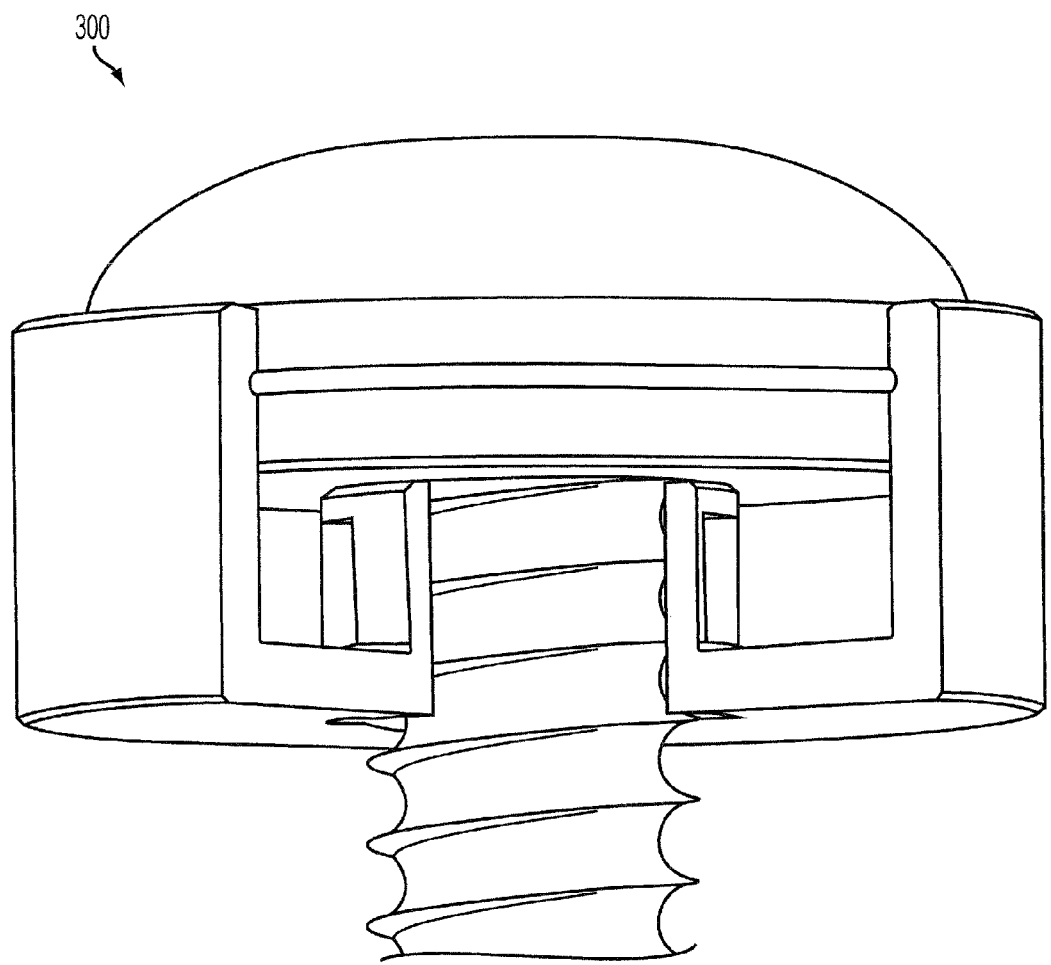
FIG. 38 illustrates a partial cutaway of a close-up perspective view of a portion of a self-sealing attachment assembly in an assembled configuration, in accordance with certain aspects of the present invention.
Figure 39:
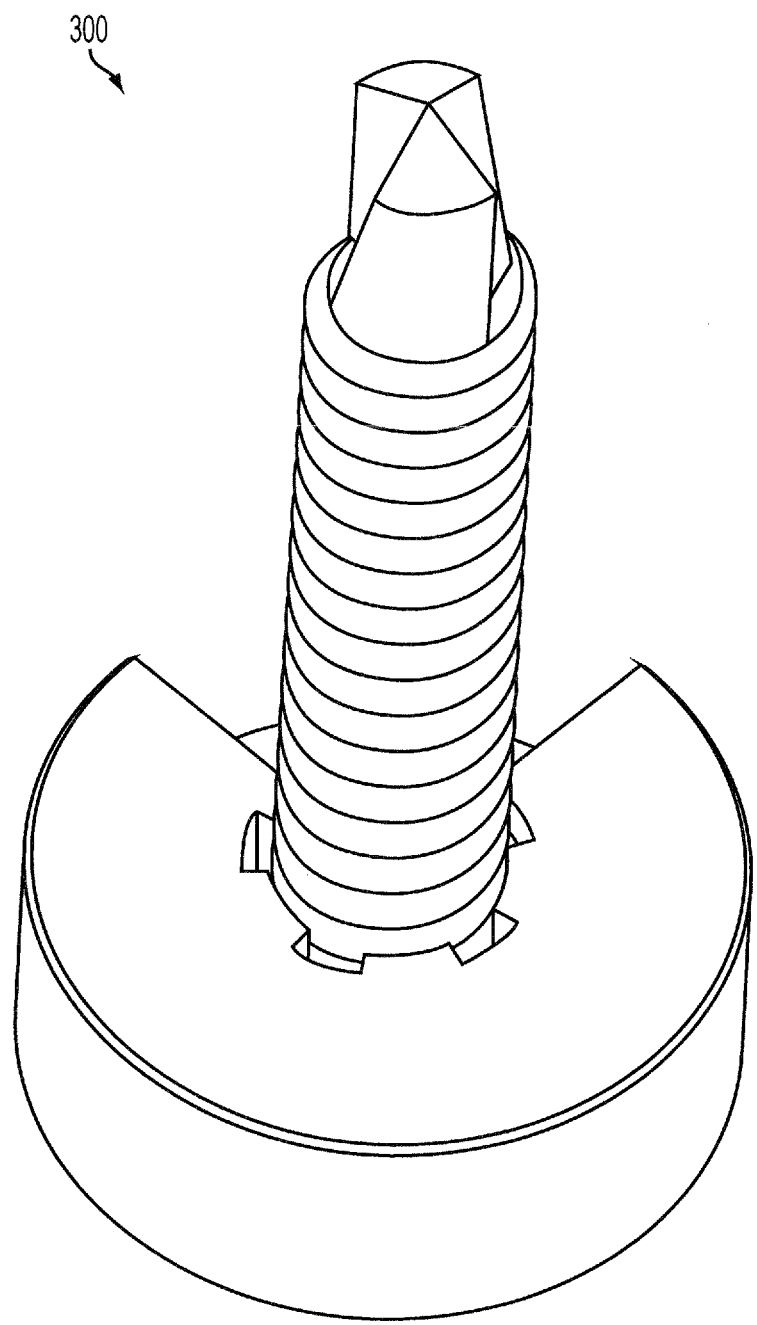
FIG. 39 illustrates a bottom perspective view of a self-sealing attachment assembly in an assembled configuration, in accordance with certain aspects of the present invention.

As shown in FIG. 34, an outer surface of the outer piston wall 356 is configured to slidably engage an inner surface of the outer wall 314 of the base portion 310, and an inner surface of the inner piston wall 354 forms a piston cylinder 365 configured to slidably engage an outer surface of the inner wall 316 of the base portion 310. Thus, the base portion 310 may be interference fit, for example, to encompass the piston member 350 with zero clearance between the outer surface of the outer piston wall 356 and the inner surface of the outer wall 314.

With the sealant material 340 provided in the receptacle 325, the piston member 350 may be securely coupled with the base portion 310 by press fitting the piston member 350 into the piston retaining space 326 of the base portion 310 until the annular bead 358 engages the recessed channel 318. With the piston member 350 thus securely coupled to the base portion 310, the self-sealing fastening assembly 300 may be installed with a fastener member 370. In other aspects in accordance with the present invention, the fastener member 370 may be provided as an integral element of the assembly 300.

As shown in FIGS. 34-39, the shank of the fastener member 370 may be extended through the piston cylinder 365 of the piston member 350 nested in the base portion 310 and the through-hole 320 of the base portion 310 until a head 372 of the fastener member engages an upper surface of the outer piston wall 356 and upper surfaces of the support members 360 of the piston member 350. The self-sealing attachment assembly 300 may be driven (or tightened in the case of a nut and bolt) into a structural member 380 to attach a construction material, for example, such as a waterproof building paper, plywood, or a plaster lath, to a structure or to attach various structural components directly to one another. The fastener member 370 may be driven or tightened so that the annular bead 358 disengages from the recessed channel 318 and the annular piston member 350 slides through the receptacle 325, forcing a displacement of the enclosed sealant material 340 out of the exit channels 330 and into the area surrounding the penetration hole formed by the fastener member 370 entering the structural member 380, for example. In this manner, the piston cylinder 365 slidably engages the outer surface of the inner wall 316 so that the uniform annular lower surface 352 displaces the sealant material 340 while preventing escape of the sealant material 340 from the receptacle 325 other than through features provided for communicating through the lower plate 312, such as exit channels 330. The sealant material 340 will cover effectively around the hole to also provide a seal against enlargements of the hole as a result of movement of the structural member 380 during installation, for example, or due to an oversized hole initially provided compared to the size of the fastener 370 being used. Additional exemplary features, including expansion slits, exit apertures, depressions or channels may be provided on a lower surface of the lower plate 312 to direct and/or control the escape of the sealant material 340 from the receptacle 325 while providing increased surface area, for example, for increasing the strength of the bond between the attachment assembly 300 and the structural member 380.

Figure 42:
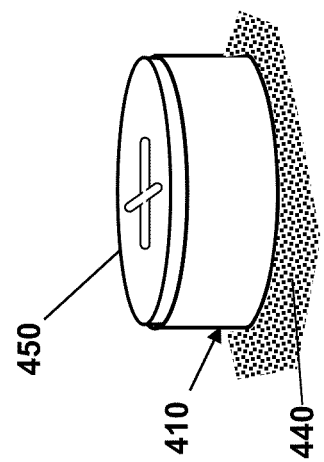
FIG. 42 illustrates a perspective view of the self-sealing attachment assembly of FIG. 41 in an actuated configuration, in accordance with certain aspects of the present invention.
Figure 41:
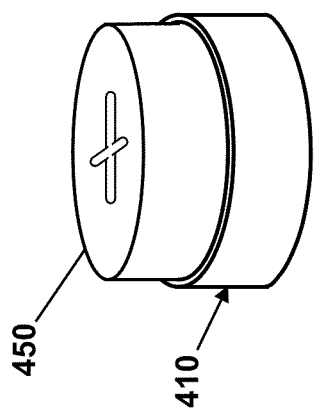
FIG. 41 illustrates a perspective view of the self-sealing attachment assembly of FIG. 40 in an assembled configuration, in accordance with certain aspects of the present invention.
Figure 40:
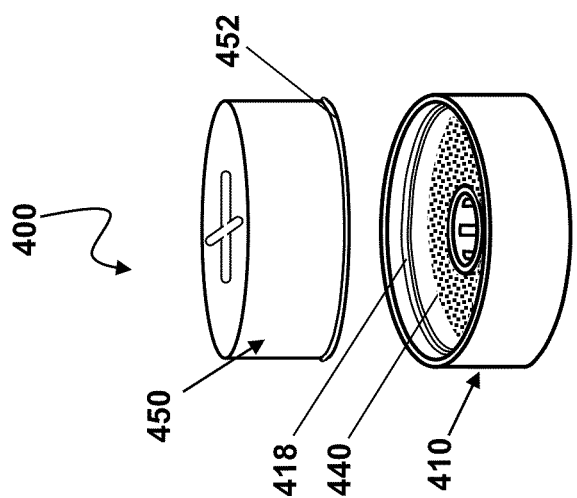
FIG. 40 illustrates a perspective view of a self-sealing assembly in a preassembled configuration, in accordance with certain aspects of the present invention.

Although the self-sealing attachment assembly described above is shown as having a piston member 350 nested entirely in the base portion 310, a variety of configurations of a piston member and base portion may define, with or without a separate fastener, a suitable means for providing an assembly for attachment to a construction material. For example, FIGS. 40-42 illustrate a self-sealing assembly 400 in accordance with certain aspects of the present invention that functions in most respects similar to the self-sealing attachment assembly 300, and, as such, a majority of the structure and functional aspects of the applicator assembly 400 are not repeated here. The assembly 400 may include a base portion 410 and a piston member 450. The base portion 410 and the piston member 450 may be composed of a plastic, such as a high-density polyethylene (HDPE) or high-density polypropylene (HDPP), or any other suitable material, including nylon, rubber, fiberglass, wood, or metal. A material 440, which may be a sealant material or a high-strength bonding material, for example, may be loaded directly into the base portion 410 and secured therein by the piston member 450 until released by an applied force on the piston member 450. A securing means, such as a recessed channel 418 may be provided in the base portion 410 to couple with a securing mechanism, such as an annular lip 452, provided on the piston member 450 for coupling the piston member 450 to the base portion 410.

As shown in FIGS. 40-42, the piston member 450 may be formed to slideably engage the base portion 410 and occupy a substantial portion of the interior receptacle area of the base portion 410, thereby releasing the material 440 through exit apertures or a through-hole, for example, provided in the base portion 410. Any suitable means for actuating the piston member 450 to displace through the interior receptacle portion of the base portion 410 may be used. For example, the piston member 450 may be formed with external threads on a sidewall that mate with an internally threaded sidewall of the base portion 410, wherein the piston member 450 is screwed down into the base portion 410, displacing the material 440 and leaving the assembly 400 bonded to a construction material, for example. Alternatively, a separate fastener may be used to drive the piston member 450 into the base portion 410, as described above, for example, with respect to assembly 300. As shown in FIG. 42, the piston member 450 may be formed to have a depth dimension greater than the depth dimension of the base portion 410 when fully engaged. In this manner, the depth of the piston member 450 may be varied, for example, to provide varying final elevations of the assembly 400 when installed. The piston member 450 may be hollow or solid, for example, depending on the structural needs of the installation. For example, where the assembly 400 may be used as a hanger or spacer between construction materials, a solid configuration of the piston member 450 may be used to provide enhanced structural stability to the installation.

The previous description is provided to enable any person skilled in the art to practice the various embodiments described herein. Various modifications to these embodiments will be readily apparent to those skilled in the art, and the generic principles defined herein may be applied to other embodiments. For example, although disclosed above for use with a sealant material in a structural building environment, the self-sealing fastening assembly may be used to contain and release a variety of materials in any variety of environments, including lubricants such as grease and oil, for example. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A self-sealing attachment assembly, comprising:
    a base portion defining a receptacle comprising
        a lower plate having a through-hole and
        a side wall, the side wall having a first end and a second end, the first end integrally formed to extend from the lower plate, and
        an opening formed by the second end of the side wall, the opening configured to receive a head portion of a fastener comprising a head portion and a shank portion;
    a sealant material in the receptacle; and
    a cover secured to the base portion and enclosing the opening;
    wherein the cover is configured to receive a driving force from the fastener and dispense the sealant material via the through-hole by displacement through the receptacle when actuated by the driving force.

2. The self-sealing attachment assembly of claim 1, wherein the sealant material comprises silicone or urethane caulking, butyl rubber, or tar.

3. The self-sealing attachment assembly of claim 1, wherein the side wall forms interference fit encompassing the cover with zero clearance between the cover and the side wall.

4. The self-sealing attachment assembly of claim 1, wherein the cover comprises an access hole configured to receive a fastener.

5. The self-sealing attachment assembly of claim 1, wherein the cover prevents escape of the sealant material through the opening in the receptacle during displacement of the cover through the receptacle.

6. The self-sealing attachment assembly of claim 1, wherein the lower plate is annular and the sidewall is a cylindrical outer wall and further comprising a concentric cylindrical inner wall joined to the annular lower plate.

7. The self-sealing attachment assembly of claim 6, wherein the inner wall has a lower height than the outer wall.

8. The self-sealing attachment assembly of claim 7, further comprising a piston retaining space defined by an area interior to the outer wall and above an upper surface of the inner wall.

9. The self-sealing attachment assembly of claim 8, wherein the cover comprises a piston member having a uniform annular lower surface joining concentric inner and outer piston walls.

10. The self-sealing attachment assembly of claim 9, wherein the piston member is secured to the base portion and occupies the piston retaining space.

11. The self-sealing attachment assembly of claim 6, wherein the inner wall comprises exit channels providing fluid communication between the receptacle and the through-hole.

12. A self-sealing attachment assembly, comprising:
a sealing assembly comprising:
a base portion defining a receptacle comprising
a lower plate having a through-hole and
a side wall, the side wall having a first end and a second end, the first end integrally formed to extend from the lower plate, and
an opening formed by the second end of the side wall;
a sealant material in the receptacle;
a cover secured to the base portion and enclosing the opening; and
a fastener having a head portion and a shank portion, the opening configured to receive the head portion and the shank portion extending through the through-hole.

13. The self-sealing attachment assembly of claim 12, wherein the lower plate is annular and the sidewall is a cylindrical outer wall and further comprising a concentric cylindrical inner wall joined to the annular lower plate.

14. The self-sealing attachment assembly of claim 13, wherein the inner wall has a lower height than the outer wall.

15. The self-sealing attachment assembly of claim 14, further comprising a piston retaining space defined by an area interior to the outer wall and above an upper surface of the inner wall.

16. The self-sealing attachment assembly of claim 15, wherein the cover comprises a piston member having a uniform annular lower surface joining concentric inner and outer piston walls.

17. The self-sealing attachment assembly of claim 16, wherein the piston member is secured to the base portion and occupies the piston retaining space.

18. The self-sealing attachment assembly of claim 17, wherein the inner wall comprises exit channels providing fluid communication between the receptacle and the through-hole.

19. The self-sealing attachment assembly of claim 18, wherein an inner surface of the inner piston wall forms a piston cylinder configured to slidably engage an outer surface of the inner wall.

20. The self-sealing attachment assembly of claim 12, wherein the cover comprises an access hole for mounting the sealing assembly to the fastener by extending the fastener through the access hole and the through-hole.

21. The self-sealing attachment assembly of claim 20, wherein the cover is movable within the receptacle to dispense the sealant material through the through-hole.

22. The self-sealing attachment assembly of claim 21, wherein in response to the fastener being driven through the access hole, the cover moves through the receptacle to dispense the sealant.

23. The self-sealing attachment assembly of claim 21, wherein the side wall forms an interference fit encompassing the cover with zero clearance between the cover and the side wall.

24. The self-sealing attachment assembly of claim 21, wherein the cover prevents escape of the sealant material through the opening in the receptacle during movement of the cover through the receptacle.

25. The self-sealing attachment assembly of claim 12, wherein the sealant material comprises silicone or urethane caulking, butyl rubber, or tar.

26. The self-sealing attachment assembly of claim 12, wherein the fastener comprises a nail, a screw or a bolt.

27. A self-sealing assembly for a structure, the assembly comprising:
a building material mounted on framing for the structure;
a sealing assembly comprising:
a base portion defining a receptacle comprising:
a lower plate having a through-hole and
a side wall, the side wall having a first end and a second end, the first end integrally formed to extend from the lower plate, and
an opening formed by the second end of the side wall;
a sealant material in the receptacle;
a cover secured to the base portion and enclosing the opening; and
a fastening member supporting the sealing assembly;
wherein the fastening member includes a head and a shank, the opening configured to receive the head and the shank extending through the sealing assembly and the building material into the framing; and
wherein the cover of the sealing assembly is compressed by the head of the fastening member into the base portion to dispense the sealant material through the through-hole to seal a hole formed by the shank of the fastening member in the building material.

28. The self-sealing assembly of claim 27, wherein the sealant material comprises silicone or urethane caulking, butyl rubber, or tar.

29. The self-sealing assembly of claim 27, wherein the fastening member comprises a nail, a screw or a bolt.

30. A self-sealing attachment assembly, comprising:
a base portion defining a receptacle comprising
a lower plate having a through-hole and
a side wall, the side wall having a first end and a second end, the first end integrally formed to extend from the lower plate,
an opening formed by the second end of the side wall;
a sealant material in the receptacle; and
a cover secured to the base portion and enclosing the opening, the cover comprising a head portion and a shank portion, the opening configured to receive the head portion and the shank portion extending through the through-hole;
wherein the cover is configured to receive a driving force from a fastener and dispense the sealant material via the through-hole by displacement through the receptacle when actuated by the driving force.

31. The self-sealing attachment assembly of claim 30, wherein the sealant material comprises silicone or urethane caulking, butyl rubber, or tar.

32. The self-sealing attachment assembly of claim 30, wherein the side wall forms an interference fit encompassing the cover with zero clearance between the cover and the side wall.

33. The self-sealing attachment assembly of claim 30, wherein the cover prevents escape of the sealant material through the opening in the receptacle during displacement of the cover through the receptacle.

34. The self-sealing attachment assembly of claim 30, wherein the cover comprises a nail, a screw or a bolt.

* * * * *